(12) United States Patent
Ferlitsch (10) Patent No.: US 7,180,619 B2
(45) Date of Patent: Feb. 20, 2007

(54) METHODS AND SYSTEMS FOR RECOVERING A FAILED PRINT JOB

(75) Inventor: Andrew R. Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 804 days.

(21) Appl. No.: 10/003,800

(22) Filed: Oct. 23, 2001

(65) Prior Publication Data
US 2002/0097429 A1 Jul. 25, 2002

Related U.S. Application Data (63) Continuation-in-part of application No. 09/894,928, filed on Jun. 28, 2001, which is a continuation-in-part of application No. 09/681,409, filed on Mar. 30, 2001, which is a continuation-in-part of application No. 09/681,416, filed on Mar. 30, 2001, now Pat. No. 7,046,384, which is a continuation-in-part of application No. 09/681,208, filed on Feb. 22, 2001.

(60) Provisional application No. 60/261,132, filed on Jan. 11, 2001.

(51) Int. Cl.
*G06F 15/00* (2006.01)
(52) U.S. Cl. .................. 358/1.15; 358/1.16; 358/1.13; 710/19
(58) Field of Classification Search ............. 358/1.15, 358/1.13, 1.16, 1.14; 710/19
See application file for complete search history.

(56) References Cited

U.S. PATENT DOCUMENTS

| | | | |
|---|---|---|---|
| 5,241,397 A | 8/1993 | Yamada | 358/296 |
| 5,287,194 A | 2/1994 | Lobiondo | 358/296 |
| 5,528,734 A | 6/1996 | Sanchez | 395/115 |
| 5,845,058 A | 12/1998 | Shaw et al. | 395/114 |
| 5,859,711 A | 1/1999 | Barry et al. | 358/296 |
| 5,897,260 A | 4/1999 | Zingher | 400/719 |
| 5,978,650 A | 11/1999 | Fischer et al. | 455/3.1 |
| 5,982,996 A | 11/1999 | Snyders | 395/114 |
| 5,995,721 A | 11/1999 | Rourke et al. | 395/114 |
| 5,995,723 A | 11/1999 | Sperry et al. | 395/114 |
| 6,088,120 A | 7/2000 | Shibusawa et al. | 358/1.15 |
| 6,157,465 A | 12/2000 | Suda et al. | 358/407 |
| 6,229,622 B1 | 5/2001 | Takeda | 358/1.16 |
| 6,248,996 B1 | 6/2001 | Johnson et al. | 250/234 |
| RE37,258 E | 7/2001 | Patel et al. | 358/1.15 |
| 6,266,150 B1 | 7/2001 | Brossman et al. | 358/1.15 |
| 6,337,745 B1 | 1/2002 | Aiello, Jr. et al. | 358/1.15 |
| 6,452,692 B1* | 9/2002 | Yacoub | 358/1.15 |
| 6,618,167 B1* | 9/2003 | Shah | 358/1.15 |
| 6,700,678 B1* | 3/2004 | Luman | 358/1.15 |
| 2001/0038462 A1 | 11/2001 | Teeuwen et al. | 358/1.15 |
| 2002/0027673 A1 | 3/2002 | Roosen et al. | |
| 2002/0042798 A1 | 4/2002 | Takei et al. | |

\* cited by examiner

*Primary Examiner*—Kimberly Williams
*Assistant Examiner*—Andrew Lam
(74) *Attorney, Agent, or Firm*—Krieger Intellectual Property, Inc.; Scott C. Krieger (57) ABSTRACT

Embodiments of the present invention comprise systems and methods for monitoring a print task and resending a failed print task to a printer when a failure occurs.

16 Claims, 10 Drawing Sheets

Traditional Spooler Based Print Model – Print Failure
FIG. 1

Respooling of Failed Job 1, after Reboot – Print Failure Not Fixed – Raw Data
FIG. 2

Despooling of Job 1 – Print Failure – Journaled Data

FIG. 3

Respooling of Job 1 After Reboot – Print Failure Not Fixed – Journaled Data

Respooling Failed Print Job after Successful Print Job – Journaled Data

METHODS AND SYSTEMS FOR RECOVERING A FAILED PRINT JOB

CROSS REFERENCE TO RELATED APPLICATIONS

This application is a continuation-in-part (CIP) of U.S. patent application Ser. No. 09/894,928, filed Jun. 28, 2001, entitled "Methods and Systems for Page-Independent Spool File Sheet Assembly," invented by Andrew Rodney Ferlitsch, et al.; which is a continuation-in-part (CIP) of two U.S. patent applications: U.S. patent application Ser. No. 09/681,409, filed Mar. 30, 2001, entitled "Methods and Systems for Print-Processor-Based Printer Status Detection and Print Task Distribution," invented by Andrew Rodney Ferlitsch, et al.; and U.S. patent application Ser. No. 09/681,416, filed Mar. 30, 2001, entitled "Methods and Systems for Print-Processor-Based Print Task Error Recovery," invented by Andrew Rodney Ferlitsch, et al., now U.S. Pat. No. 7,046,384; both of which are continuation-in-part patent applications of U.S. patent application Ser. No. 09/681,208, filed Feb. 22, 2001, entitled "Methods and Systems for Print-Processor-Modified Printing," invented by Andrew Rodney Ferlitsch, et al.; which claims the benefit of U.S. Provisional Patent Application Ser. No. 60/261,132, entitled "Methods and Systems for Print-Processor-Modified Printing," invented by Andrew Rodney Ferlitsch, et al., filed Jan. 11, 2001.

BACKGROUND

In many computing environments a print job may be initiated from an application, a batch file or some other method. Once a print job is initiated, the job is handed off along a print stream comprised of various print stream components that process the job into a format that can be accepted by a printing device for printing onto hard copy media. In some environments, print streams may be fairly simple, however in most common operating systems, such as Microsoft Windows systems, the print stream can be rather complex with many components and processing steps. While these systems are extremely reliable, errors can occur that cause a print job to fail.

A print job may also fail due to printing device errors. These errors may occur in the circuitry and logic of the printing device. They may also occur due to mechanical problems within the printing device. A print job may also fail due to improper preparation of the printing device as when a paper tray is empty or when the device is taken off line.

Various operating systems have methods for recovering from print job failures, however these methods have many drawbacks that often lead to failed recovery. In some systems, failed print jobs are stored in a spool directory until some arbitrary event occurs, but these events often don't occur until after the print job is needed or after the user has already found an alternative solution.

In some Microsoft operating systems, such as Windows 9x, an attempt to restart a failed print job commences when the operating system is restarted. There are several drawbacks to this approach: 1) the system must be rebooted; 2) the print job can fail again as the reason for the previous failure may not have been resolved; 3) the reason for the failure and the associated system configuration data is not recorded for future analysis; and 4) there is no option to restart the print job on an alternative, compatible printing device that is functioning. Other problems and shortcomings also exist in current systems.

SUMMARY

The systems and methods of embodiments of the present invention provide means for recovering from print job failures. Some embodiments may record print job failure data to identify a failure mode. Some embodiments may detect available printing devices when a selected device fails. Some embodiments may redirect a failed print job to a functioning printing device.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the systems and methods of the present invention, as represented in FIGS. 1 through 11 is not intended to limit the scope of the invention, as claimed, but is merely representative of the presently preferred embodiments of the invention. Some embodiments of the present invention will be best understood by reference to the drawings, wherein like parts are designated by like numerals throughout.

The systems and methods of embodiments of the present invention typically comprise one or more printing devices, which may be connected locally, through a network or through a remote printing environment. These systems and methods may further comprise a computing device capable of generating or transmitting a print job to a printing device. These embodiments may also comprise a printer driver, a spooler, a print processor and other print system components that process, transmit or otherwise function to produce a print job. In some embodiments, these components may exist in a Microsoft Windows 9x, NT, 2000, XP or similar operating system. Details of these operating system print system components and processes may be obtained by reference to the Microsoft Windows Driver Development Kits (DDKs) and associated documentation, which is hereby incorporated herein by reference.

Embodiments of the present invention which utilize a Microsoft Windows® operating system generally comprise a printer driver, spooler, print processor and other print system components which process print tasks generated through the operating system and applications running on the operating system. Embodiments used in conjunction with other operating systems will utilize similar processing elements.

Exemplary embodiments of the present invention will be described with terminology related to a Microsoft Windows® environment, however these terms shall relate to equivalent elements in other operating systems. For example, the print processor described in many embodiments will relate to a print processor common in the Windows® environment as well as elements with equivalent functions in other operating systems.

The definitions in this and subsequent paragraphs apply throughout this specification and related claims. The term "print job" may refer to any combination of data that can be printed. A print job may comprise text and/or graphics and may comprise part of a page, a single page or many pages. Print jobs may be rendered or un-rendered. Generally, a print job is generated by an application, such as a word processor, spread sheet, etc., however, a print job may also comprise a file or data in memory that may be sent directly to a print process.

The term "print copy" or "copy" may refer to data, code or commands which generate a single printing device output of a print job or may refer to the actual hard copy output of the print job.

The term "print task" may comprise any combination of print jobs and copies thereof. A print task may comprise one or more print jobs and one or more copies of each print job.

The term "copy splitting" may refer to a process by which a print task comprising multiple copies is divided into multiple modified print tasks with each modified print task comprising a portion of the total number of copies.

The term "job splitting" may refer to a process by which a print task comprising at least one print job is split into multiple modified print tasks with each modified print task comprising a portion of a print job.

The term "network" may refer to any combination of computing devices and peripherals, such as printing devices, wherein the devices can communicate with each other. The term "network" may comprise Local Area Networks (LANs), Wide Area Networks (WANs) and many other network types. A network may be connected using conventional conductive cable, fiber-optic cable, phone line cable, power line cable or other electrical and light conductors and other signal transmission media as well as wireless connections using infrared, RF or other wireless methods.

To simplify discussion of a printing system used under a Microsoft Windows operating system, some groups of system components may be referred to collectively. Some components may also be referred to generically by their group name. For example, a spooler API server may be referred to as a spooler. A group of components comprising a spooler client interface, spooler API server, router, print job creation API and job scheduling API may be referred to as a spooler in a Windows NT/2000 operating system. A group of components comprising a language monitor, port monitor and port driver stack may be referred to as a port manager. A group of components comprising a file format director and EMF print processor DLL may be referred to as a print processor. Equivalent component groups may be referred to by these terms also whether in a Microsoft operating system or another system.

References to a Microsoft Windows or Windows operating system may refer to any version or variation of a Microsoft Windows operating system comprising Windows 95, Windows 98, Windows NT, Windows 2000, Windows ME, Windows XP and others. While exemplary embodiments of the present invention may be directed to a Windows operating system and environment, systems and methods directed to other operating systems such as Macintosh, UNIX, DOS, Linux, MVS and others are to be contemplated within the scope of the present invention.

Embodiments of the present invention may be embodied in software, firmware, hardware and other forms that achieve the function described herein. As embodiments of the present invention may be adapted to many environments with varying computing devices, operating systems, printing devices, network hardware and software, applications and other variables, these embodiments may take many forms to achieve their function. Some embodiments may also be transmitted as signals, for example, and not by way of limitation, embodiments may be transmitted as analog or digital electrical signals or as light in a fiber-optic line. All of these embodiments are to be considered within the scope of the present invention.

In a typical printing environment, a user may initiate a print task, which may comprise one or more documents consisting of one or more pages each. A print task may also comprise multiple copies of a print job. A print task may be pre-processed into printer-ready data, such as output in a Page Description Language (PDL) such as Print Command Language (PCL), Adobe Postscript, Portable Document Format (PDF) and Tagged-Image File Format (TIFF) as non-limiting examples. A print task may also be journaled. In a journaled print task, rendering instructions are recorded for subsequent playback. Some examples of journaled formats are Enhanced Metafile (EMF) and Sharp's Printer Meta file (PMF).

Generally, when a print task is initiated, a user makes an input selection to initiate the process. The computing device may respond with the display of a dialog such as a print dialog box, a command line query, a panel display or some other form of user interface that allows a user to select print task options. One option may be the selection of the printing device such as a printer, plotter, Multi-Function Peripheral (MFP), CD burner or other device. Once the printing device is selected, a driver and, optionally, a print processor and other print system components may be loaded. Once the driver and/or other print system components are loaded, an additional dialog may be presented to prompt a user of options available on the selected device. Options such as print quality, paper size, orientation, tray selection, manual feed, stapling, watermarks and other options may generally be selected.

In some embodiments of the present invention, print system components may present the user with a dialog that provides cluster printing options such as job-splitting, copy-splitting and pod printing as non-limiting examples. These embodiments may allow a user to select a cluster of printing devices and manage the distribution of print task portions to individual printing devices within the cluster. Some embodiments may also employ automated cluster printing capabilities that do not require user input.

Once printing options have been selected or otherwise established, either manually or automatically, print task processing may commence. Print task processing may comprise construction of print task specific information by the printer driver. This may comprise device initialization and environment data such as DEVMODE data in a Microsoft Windows environment. Rendering instructions are then compiled and either recorded for deferred playback (journaled data) or processed into printer-ready data. In some cases, a print task may be partially or wholly rendered into printer-ready data in a previous step and the compilation of rendering instruction may be skipped or partially skipped.

The output from a print driver, in a spooled print environment, may be referred to as a spool file and its contents may be referred to as spool data. A spool file may be recorded on disk, in memory, in cache or other storage media compatible with a computing device.

When the spool file is complete, control is passed from the driver to another print system component. In some systems, control is passed to a print processor, which may determine whether the data is in a printer-ready format and process the data accordingly. If the data is in a printer-ready format, it may be sent to the port of the selected printing device, if the data is journaled, it may be further processed into a printer-ready format. This process may be referred to as spooling as the data is spooled from the spool file to its destination. Once journaled data is processed into printer-ready data, it may be despooled to the port associated with its destination printing device.

Printer-Ready Mode Print Failure

Figure 1:
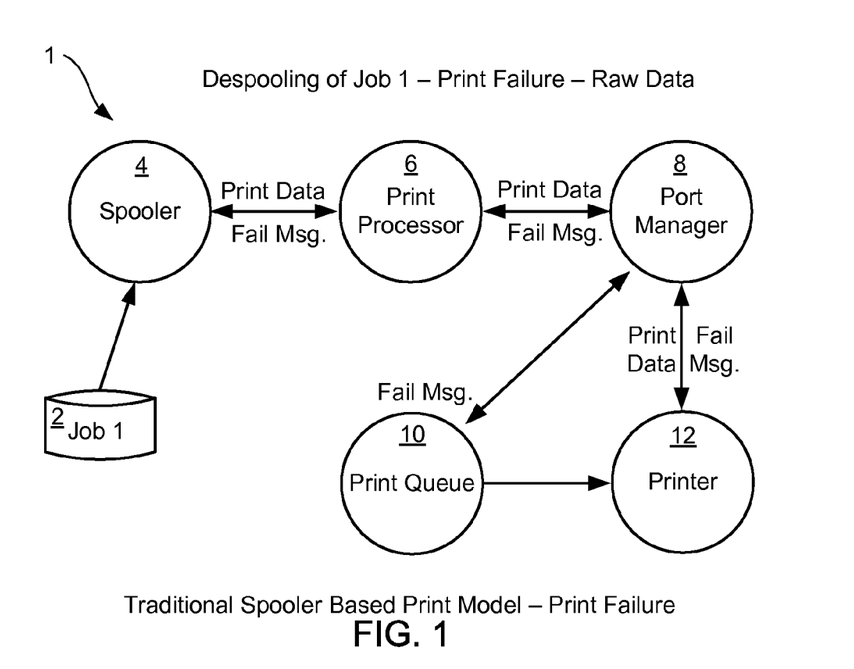
FIG. 1 is a diagram depicting a typical print system in printer-ready data mode.

In a typical print spool subsystem 1 as shown in FIG. 1, a spooler 4 may despool a print job to a print processor 6. The print processor 6 examines the job's print mode to determine whether it is a printer-ready format or a journaled format. If the mode is printer-ready (i.e., Raw), the printer-ready data is written directly to a port manager 8 associated with the selected printer 12. In a local or remote printing environment, a port manager 8 may despool printer-ready data directly to a printer 12. In a network environment, a port manager may despool data to a print queue 10 on a network print server. The print serve would then despool the printer-ready data directly to the selected printer 12.

However, in some embodiments of the present invention, if the print job fails, a failure message is sent from the point of failure back to a print system component such as a spooler 4 and/or print processor 6 or other print system component. A print failure may occur because the printer 12 is unable to print the print job. This may be due to an unavailable printer, print queue not responding, invalid port, mechanical printer failure or some other printer-related error. This may also be due to a network or server failure in a network environment.

Recovery Method—Printer-Ready Data

Figure 2:
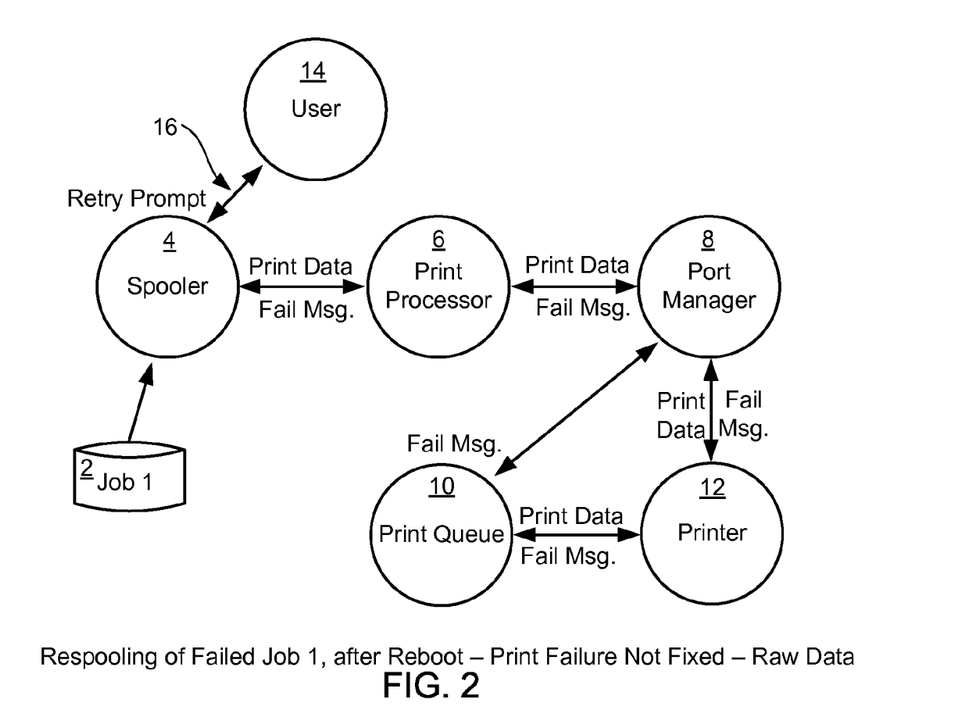
FIG. 2 is a diagram depicting a typical print system in printer-ready data mode with unsuccessful failure recovery.

Under known error-recovery methods, such as standard methods in a Windows operating system as shown in FIG. 2, a spooler 4 will leave spool data in a spool directory after a failure. When the system is re-booted, the spooler 4 examines the spool directory for residual spool data. If the spool directory contains spool data, the spooler 4 informs the user 14 that there are unprinted print jobs and prompts 16 the user 14 to input preferences regarding cancellation or restarting of the failed print job or jobs.

If a user 14 restarts the print job or jobs and the initial reason for failure of the print job(s) has not been resolved, the failure process will repeat itself.

Journaled Mode Print Failure

Figure 3:
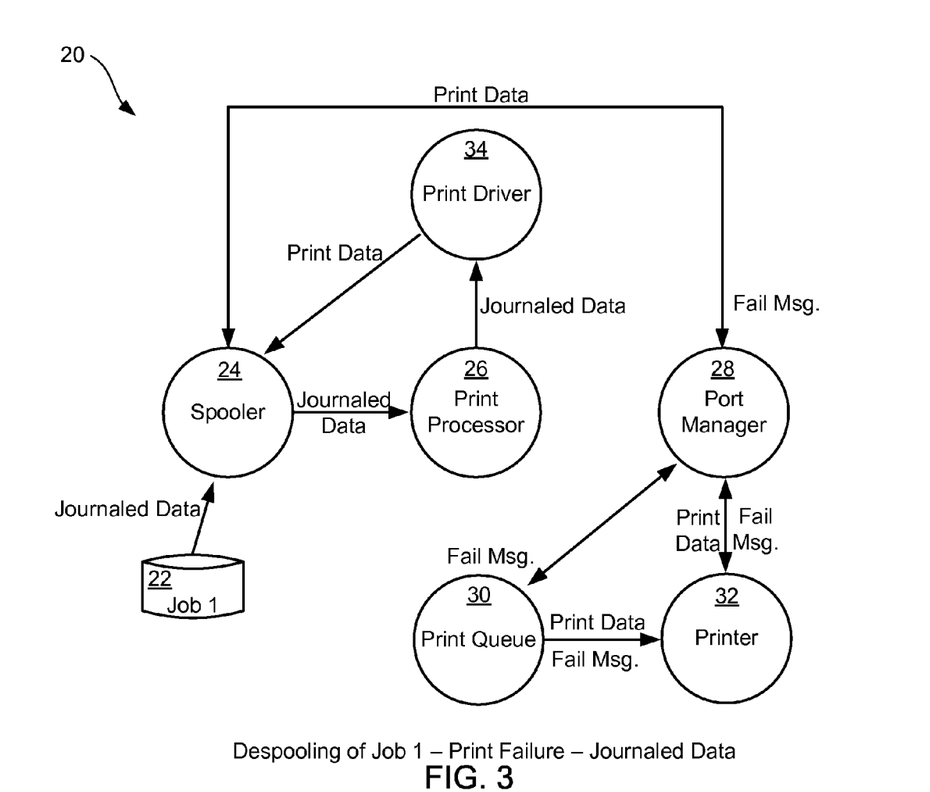
FIG. 3 is a diagram depicting a typical print system in journaled mode.

In a typical print spool subsystem in journaled mode, such as EMF mode printing as shown in FIG. 3, a spooler 24 may despool a print job to a print processor 26. The print processor 26 will examine the print mode of the data and determine whether it is printer-ready data or journaled data. In journaled mode (i.e., EMF), the journaled data is played back to the printer driver associated with the selected printer 32. The printer driver 34, with the help of a Graphic Device Interface (GDI) renders the journaled data into printer-ready data and passes the printer-ready data back to the spooler 24. Then, the spooler 24 writes the printer-ready data directly to the port manager 28 associated with the selected printer 32. In a local or remote printing environment, the port manager 28 may despool the printer ready data directly to the printer 32. In a network environment, the port manager 28 would despool the printer-ready data to a print queue 30 on a network print server. The print server would then despool the printer-ready data directly to the printer 32 associated with the print queue.

However, in some embodiments of the present invention, if the print job fails, a failure message is sent from the point of failure back to a print system component such as a spooler 24 and/or print processor 26 or other print system component. A print failure may occur because the printer 32 is unable to print the print job. This may be due to an unavailable printer, print queue not responding, invalid port, mechanical printer failure or some other printer-related error. This may also be due to a network or server failure in a network environment.

Recovery Method—Journaled Data

Figure 4:
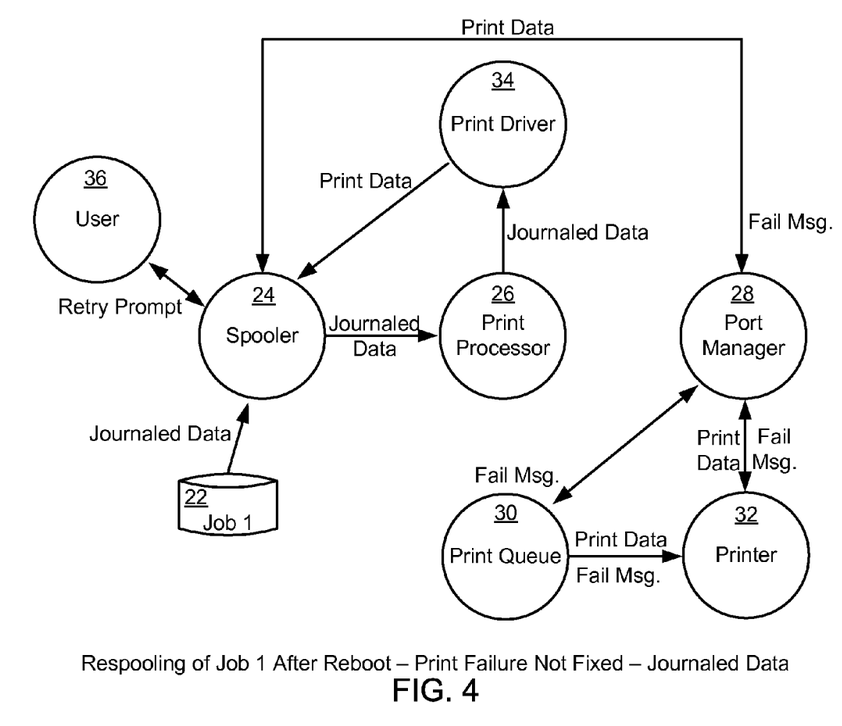
FIG. 4 is a diagram depicting a typical print system in journaled mode with unsuccessful failure recovery.

Under known error-recovery methods, such as standard methods in a Windows operating system as shown in FIG. 4, a spooler 24 will leave spool data in a spool directory after a failure. When the system is re-booted, the spooler 24 examines the spool directory for residual spool data. If the spool directory contains spool data, the spooler 24 informs the user 36 that there are unprinted print jobs and prompts 38 the user 36 to input preferences regarding cancellation or restarting of the failed print job or jobs.

If a user 36 restarts the print job or jobs and the initial reason for failure of the print job(s) has not been resolved, the failure process will repeat itself.

Improved Recovery Methods—Printer-Ready Data Mode

Embodiments of the present invention may prompt a user with options when a print job or print task fails. A user may be prompted to save the print job or task for a later retry at printing. If the print job or task is to be saved, embodiments of the present invention may also save print task-related information such as the reason for failure, print job requirements and other information. These embodiments may be embodied within a spooler, print processor or other print system component. Print task-related information may comprise the name of the documents to print, size, number of copies, number of pages, date and time and the user who initiated the job. Print task-related information may also comprise failure data, which may comprise the number of printers selected for the job, the names and model numbers of selected printers, the availability of printers and the point of failure. A point of failure may be, for example and not by way of limitation, a print queue, a port manager or a printer. Print task-related information may also comprise PDL data type (e.g., PCL, Postscript, TIFF), duplex selection, face up/down orientation, paper size, output tray selection, collation information, hole punching, stapling selections and other printing options.

Figure 5:
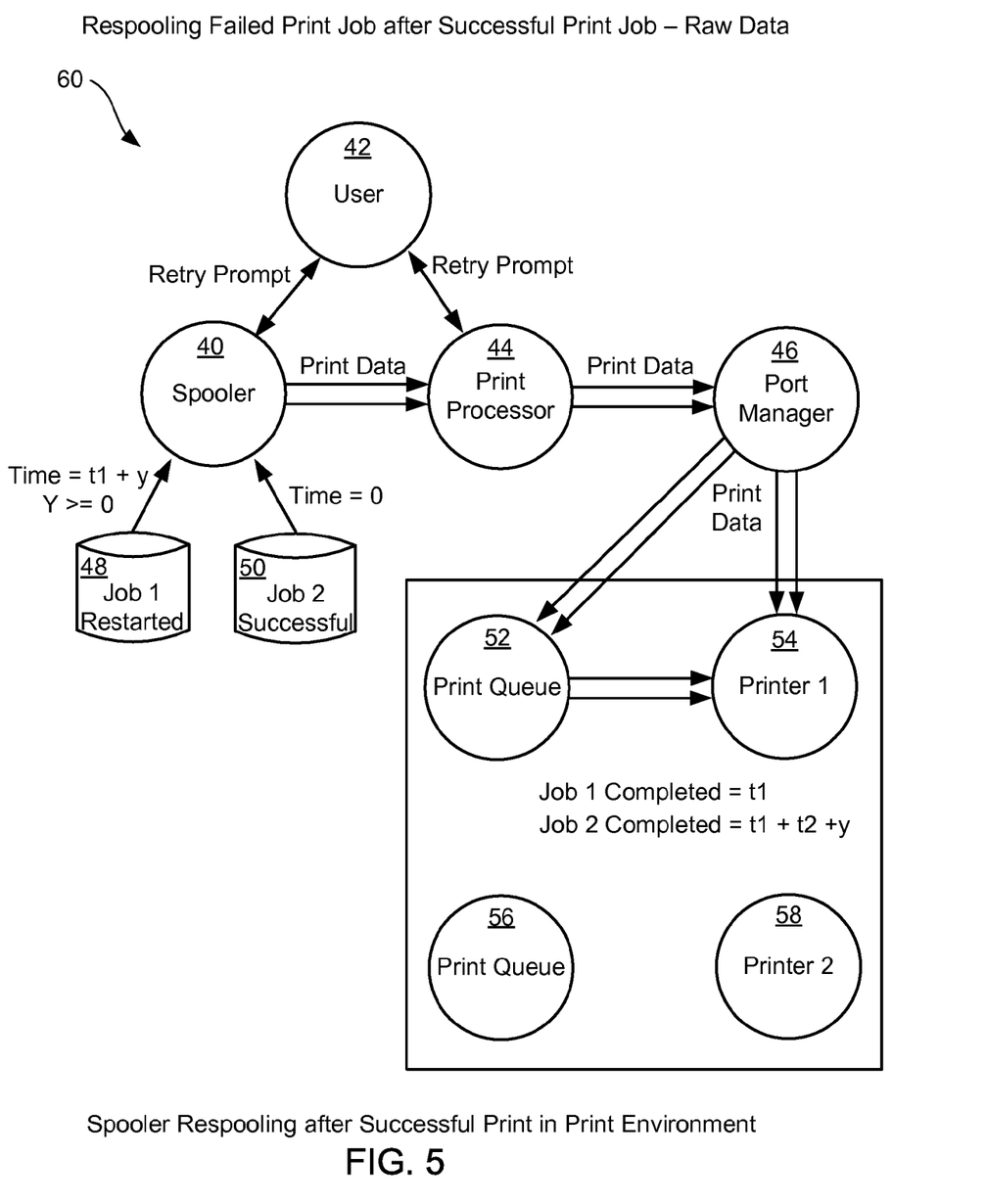
FIG. 5 is a diagram depicting an embodiment of the present invention wherein a failed print task is recovered in printer-ready data mode.

Once a failure has occurred, a print system component of embodiments of the present invention, as shown in FIG. 5, such as a spooler 40 or print processor 44, may monitor subsequent print jobs to determine their success or failure. Print jobs that fail are stored as described above. When a successful print task 50 is detected, the print task requirement and other print task data are recorded. The print system component of these embodiments, such as spooler 40 or print processor 44, then examines the spool directory for failed print tasks 48. If failed print tasks 48 are found, their characteristics may be compared to those of the successful print task 50 to determine whether they may be printed on the successful printer. Specific conditions and/or requirements may be selected by a user to control selection of failed print tasks for reprinting. Tasks may be selected based on whether they were initiated by the same user as the successful task, whether the current user has authorization to re-print the task, whether the successful printer is the same or identical to the printer selected for the initial task, whether the successful printer can meet the specified print task requirements (e.g., PDL, duplex, collation, etc.) or other criteria.

Once conditions and/or requirements have been met, print tasks selected for retry may be restarted automatically or a user 42 may be prompted to restart the selected print tasks or some subset of the selected tasks. In some embodiments, print task requirements and descriptive data may be displayed to a user 42 for each failed print task and a user 42 may select from among these tasks. A user 42 may select a task for reprinting, delete a task or skip a task and allow selection of the skipped task at a later time.

If a failed print task 48 is selected for reprinting, either manually or automatically, a print system component 40 or 44 may commence rewriting of the print task directly to the port manager 46 of the successful printer 54. If the successful printer 54 is a network printer, the task may be rewritten to its print queue 52.

Improved Recovery Methods—Journaled Mode

Embodiments of the present invention operating in journaled mode, such as EMF mode, may use recovery methods similar to those used in printer-ready data mode, such as Raw mode. These embodiments may be explained with reference to FIG. 6. When a print task fails, a user 72 may be prompted with options for saving the print task for re-printing at a later time. Alternatively, a print task may be recorded automatically upon failure of the task to print.

When a failed print task is to be saved, the spool data is saved along with additional print task-related information as explained above.

Figure 6:
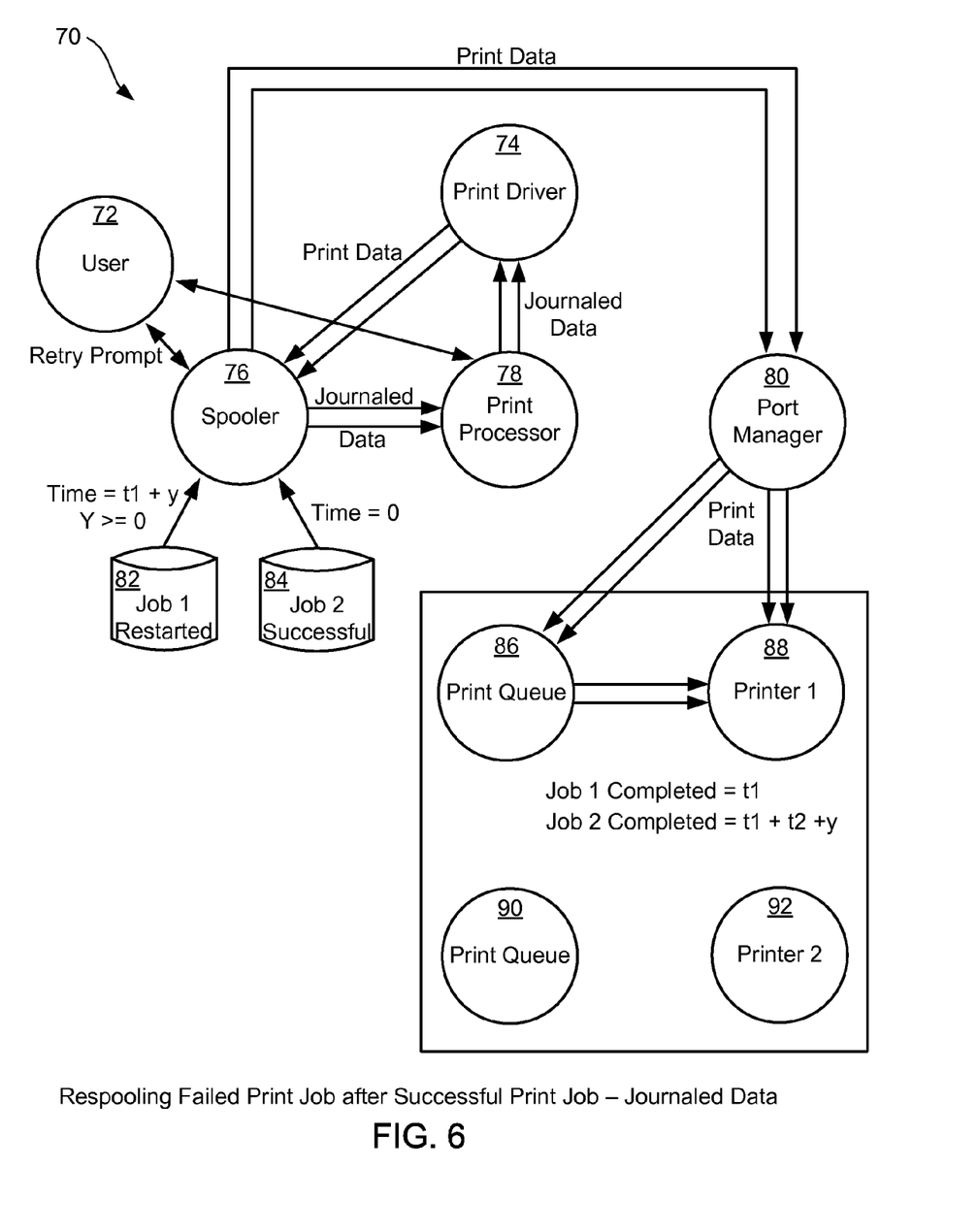
FIG. 6 is a diagram depicting an embodiment of the present invention wherein a failed print task is recovered in journaled mode.

A print system component, such as spooler 76, print processor 78 or another print system component, then monitors subsequent print tasks until a successful print task is found. When a successful print task is detected, the active print system component checks the spool directory for failed print tasks and compares the requirements of the failed print tasks to those of the successful print task or to capabilities of the printer 88 to which the successful task was sent. If it is determined that the printer is capable of printing the failed print task, the failed task is rewritten to the port manager 80 associated with the successful printer 88.

Figure 7:
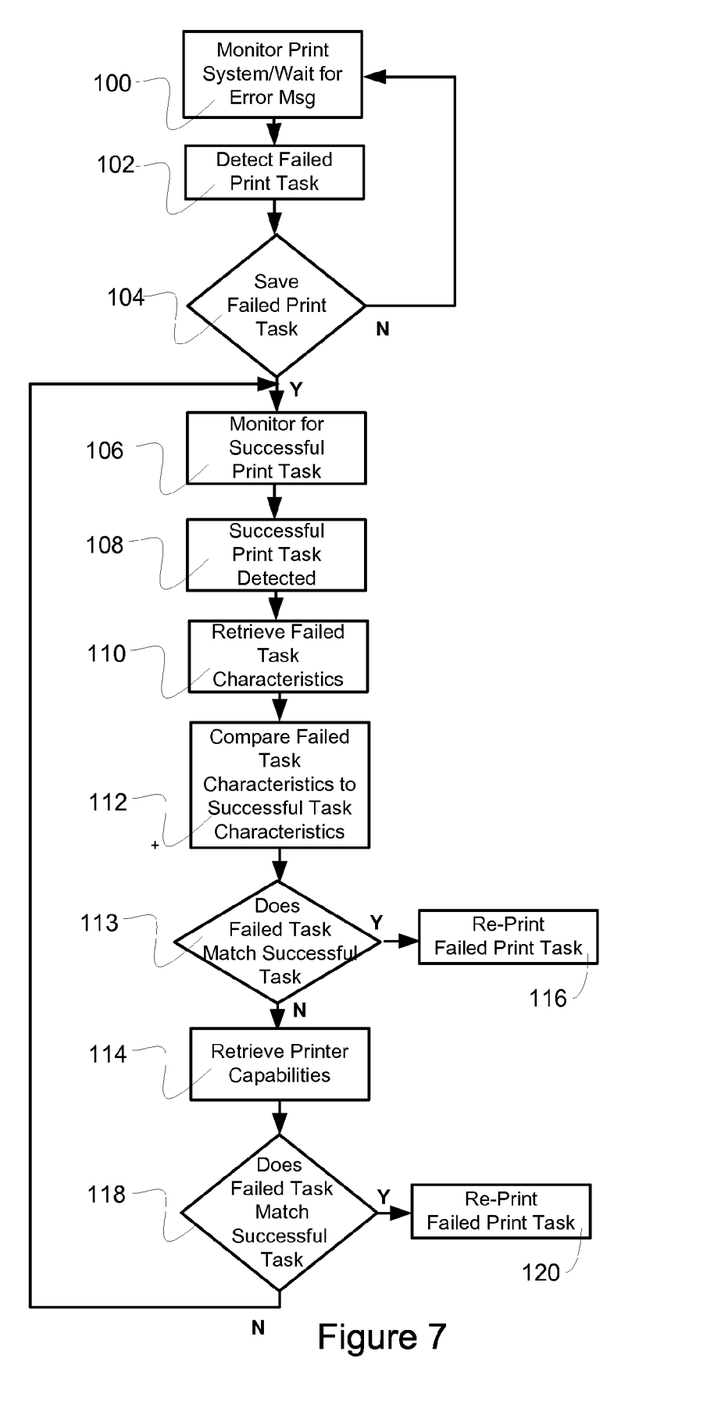
FIG. 7 is a diagram of an embodiment of the present invention depicting methods of failed print task recovery.

The function of active print system component may be further explained with reference to FIG. 7. This print system functions as a typical print system until a print task failure occurs. The system may be actively monitored or may simply wait for an error message to be sent 100. When a print task fails 102, a decision is made as to whether the print task should be saved 104 for later re-printing. This save decision 104 may be performed automatically based on prior user input or system default or may be performed through a user prompt or other user interface through which a user may elect to save or cancel a failed print task or job. If the failed print task is not saved for later re-printing, the system will delete files associated with the print task and return to normal system conditions. If the failed print task is saved for later reprinting, an active print system component will monitor subsequent print jobs 106 for failure or success.

When a successful print task is detected 108, the active print system component may analyze the successful print task and determine its characteristics. The active print system component may also retrieve the failed print task 110 and determine its characteristics and requirements. The requirements and characteristics of the failed print task may then be compared to those of the successful task 112. If the failed print task characteristics and requirements are sufficiently similar to those of the successful print task 113, the failed print task may be rewritten 116 to the port manager associated with the successful printer.

If a comparison of the failed print task and the successful print task 112 cannot be made or the suitability of the successful printer cannot be determined through comparison of the print tasks, an active print system component may otherwise obtain characteristics of the successful printer 114 to determine its capabilities. The failed print task requirements and characteristics may then be compared to the successful printer capabilities to determine whether the successful printer is capable of printing the failed print task 118. If the successful printer is found to be capable, the failed print task may be re-written to the successful printer 120.

If the successful printer is found to be incapable of printing the failed print task, the active print system component may resume monitoring 106 of print tasks until another successful task is detected.

Embodiments of the present invention may evaluate the characteristics of a successful print task and determine the suitability of a specific printer in many ways. Some embodiments, for example, may simply evaluate a successful print task to determine what printer is being used and resend a failed print task to that printer only when it is the same printer to which the failed task was originally sent.

Other embodiments may evaluate specific functions of a printer. For example, some embodiments may determine a specific reason for a print task failure and evaluate whether that problem has been resolved based on print task information.

Still other embodiments may determine that a printer is not compatible with a particular print task and modify the print task to be printed on the incompatible printer.

Figure 8:
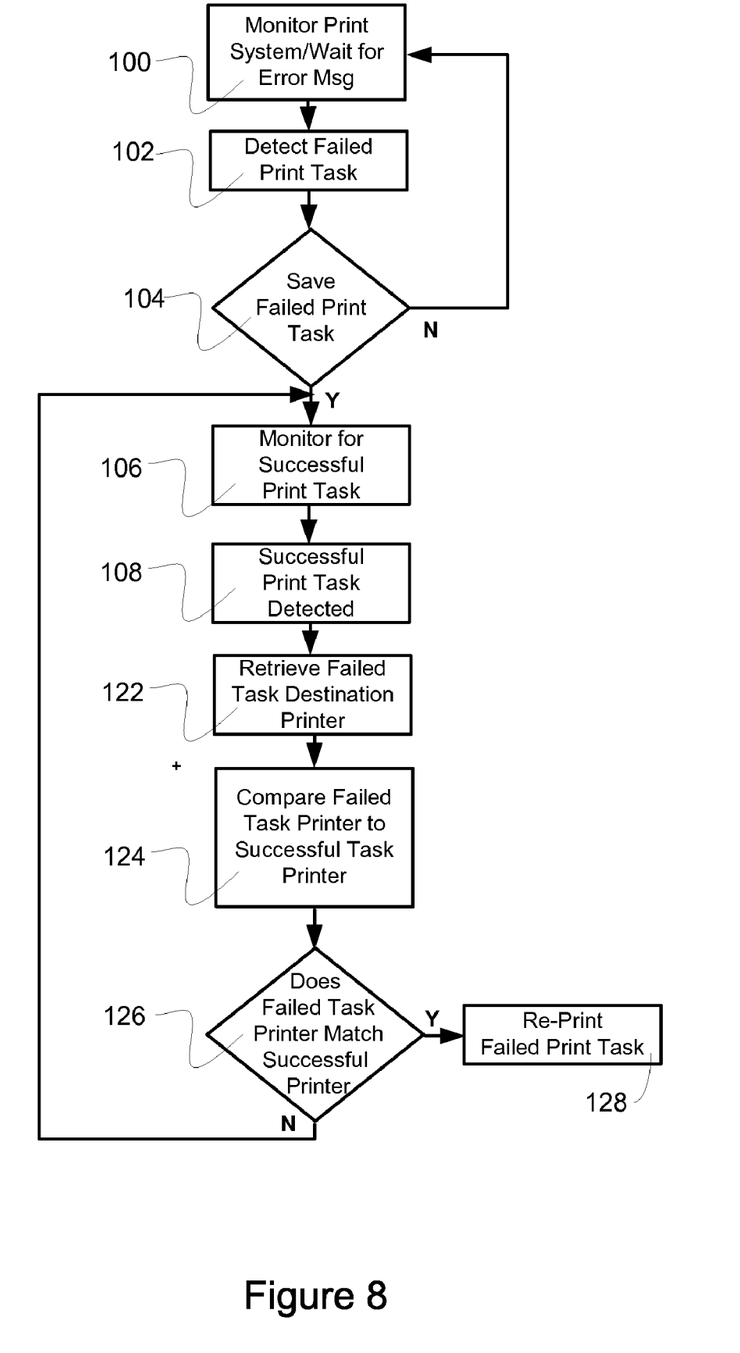
FIG. 8 is a diagram of an embodiment of the present invention in which comprising printer matching.

In reference to FIG. 8, an embodiment of the present invention may check a print system for a failed print task 100. When a failure is detected 102, the print task may be saved for re-printing 104.

Once the failed task is saved, these embodiments may monitor the system for a successful print task 106. When a successful task is found 108, the failed task destination printer is determined 122 and compared to the printer of the successful task 124. If the printers are the same 126, the failed task may be re-printed to the destination printer again 128. If the printers are not the same, the active print system component may continue monitoring for a successful print task 106.

Figure 9:
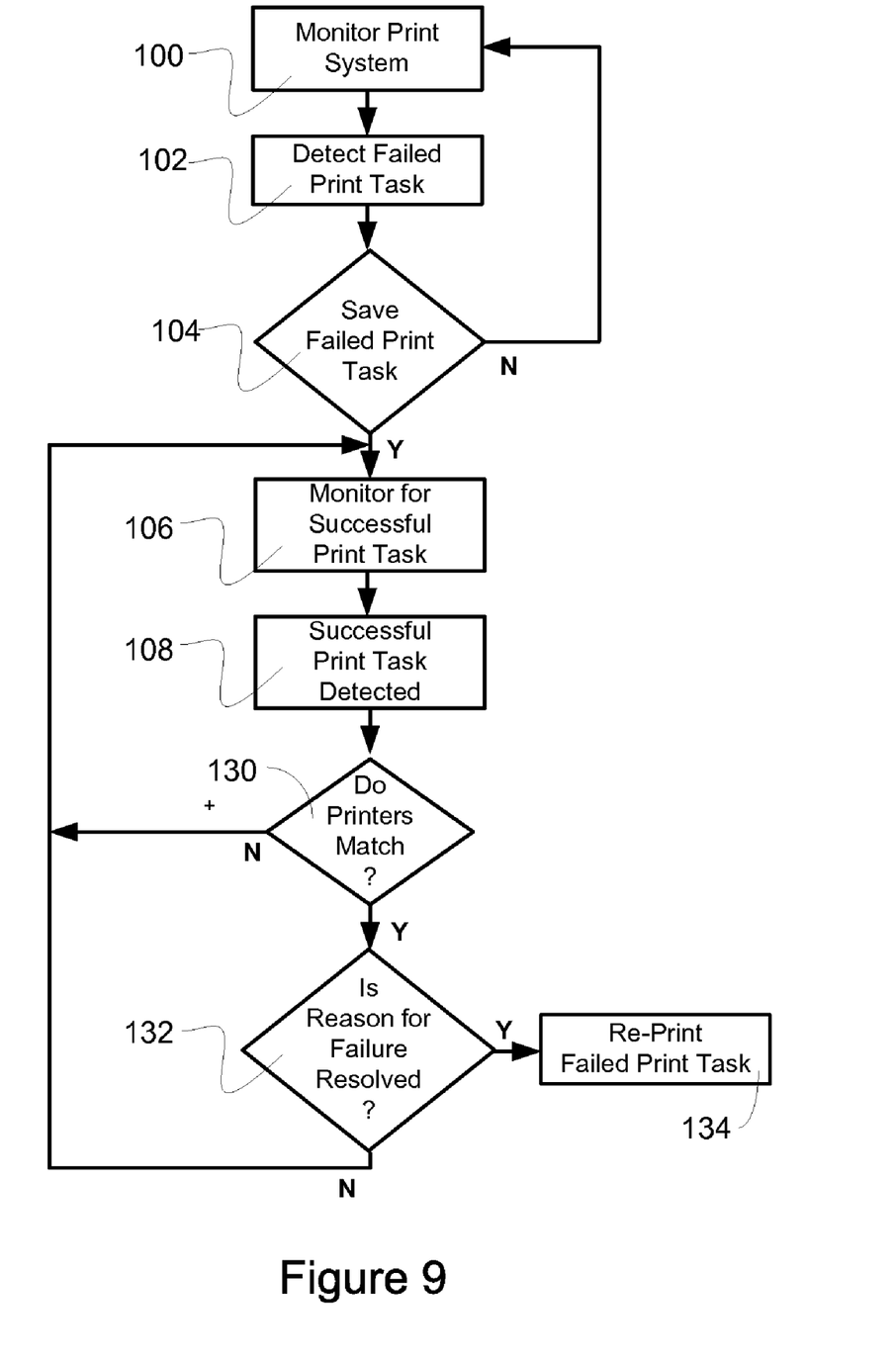
FIG. 9 is a diagram of an embodiment of the present invention comprising failure resolution checking.

Other embodiments of the present invention, shown in FIG. 9, may check for failed print tasks as explained above and save failed print tasks for re-printing 104. These embodiments also monitor for successful print tasks 106, and when a successful task is detected 108, they determine its characteristics, including its destination printer and compare the destination printer to that of the failed print task.

If the printers don't match 130, monitoring for successful print tasks continues 106. If the printers match 130, these embodiments further check print task data to determine the reason for the print task failure and whether the successful print task data indicates that the failure reason has been resolved. If the failure reason has been resolved 132, the failed print task may be re-printed 134. If the failure reason has not been resolved, successful print task monitoring may continue 106.

Figure 10:
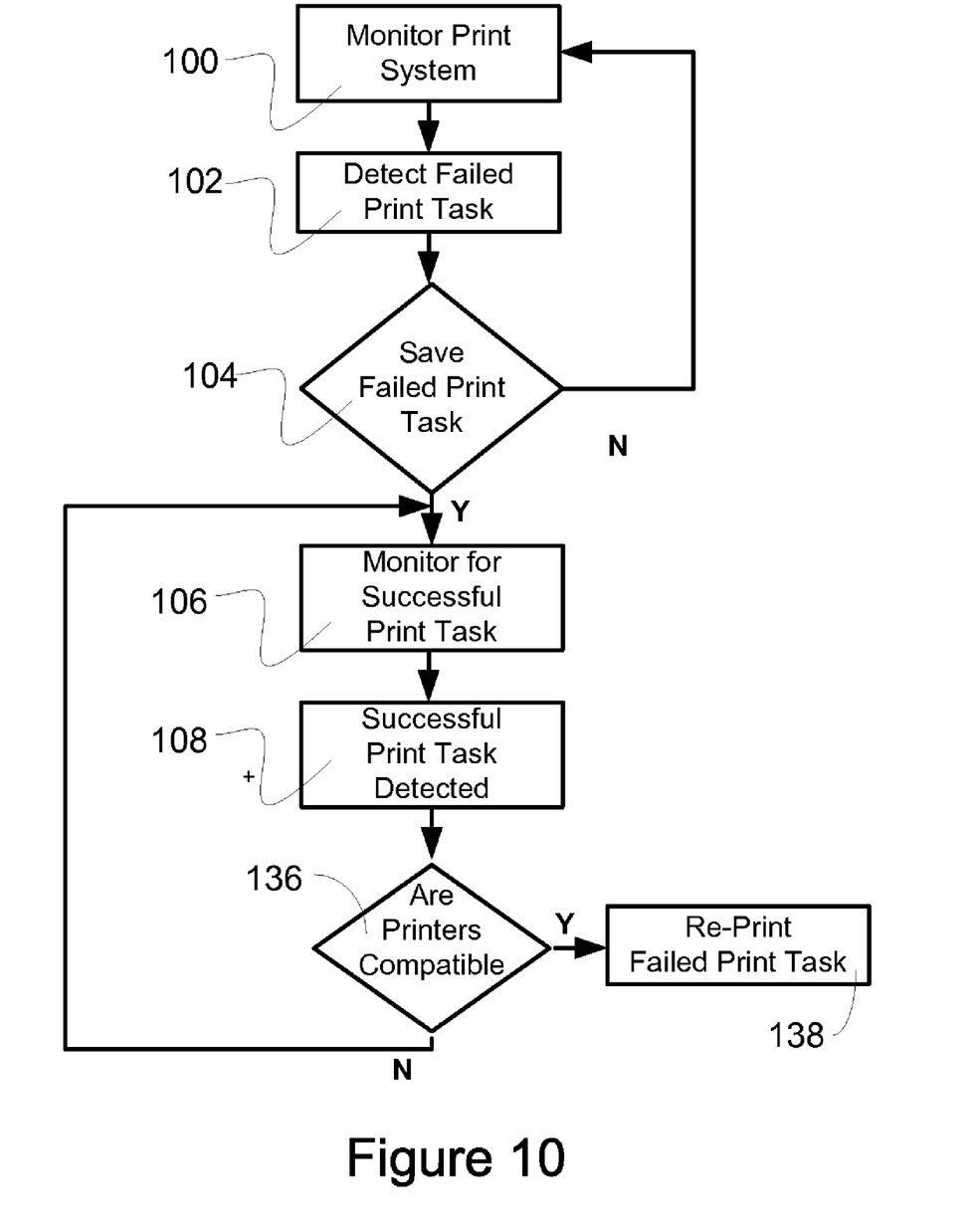
FIG. 10 is a diagram of an embodiment of the present invention comprising printer compatibility checking.

In yet other embodiments of the present invention, as illustrated in FIG. 10, a print system component may monitor the print system 100 to detect a failed print task 102. When a failed print task is detected, it may be saved 104. Subsequently, a print system component may monitor the system for a successful print task 106. When a successful task is detected 108, a print system component may analyze the successful print task to determine the characteristics of the print task and its destination printer.

Printer characteristics may be evaluated to determine whether the printer is compatible 136 with the failed print task. If the printer is compatible, the failed print task may be re-printed 138 to the successful print task's printer.

Figure 11:
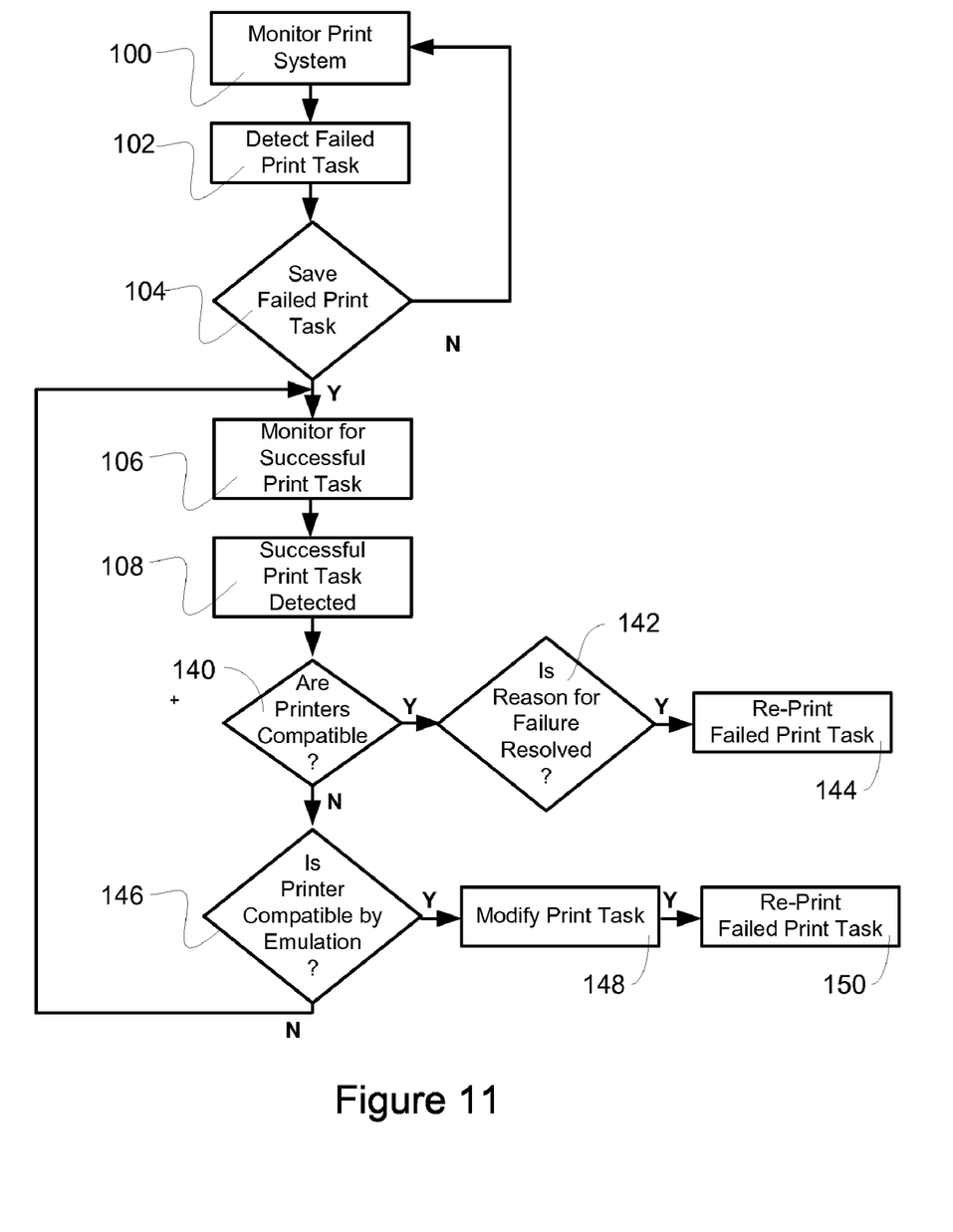
FIG. 11 is a diagram of an embodiment of the present invention comprising print task modification to render a failed print task compatible with a particular printer.

Other embodiments of the present invention may be described with reference to FIG. 11, which illustrates a print system in which a print system component may monitor for failed print tasks 100. When a failed print task is detected 102, the failed print task may be saved 104 as in other embodiments.

Once a failed task is detected and saved, a print system component, may monitor for a successful print task 106. When a successful task is detected 108, a print system component may analyze the successful print task to determine the characteristics of the print task and its destination printer.

Printer characteristics may be evaluated to determine whether the printer is the same as that of the failed print task or compatible 140 with the failed print task. If the printer is the same or compatible, a print system component may determine whether the problem that caused the failed print task is resolved 142. If the problem has been resolved, the failed print task may be re-printed 144.

If the printer is not compatible, some embodiments may further determine whether the failed print task may be rendered compatible with the printer through emulation or modification of the print task 146. If a failed print task may be rendered compatible through modification, the print task may be modified 148 and written to the successful print task's printer 150.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A method for recovering a failed print task, said method comprising:

initiating a first print task on a computing device, wherein said computing device comprises a plurality of print system components;

sending said first print task to a first component of said plurality of print system components;

sending said first print task to a selected printer that is one of a plurality of printing devices connected by a network;

monitoring with at least one component of said plurality of print system components said first print task for a print task failure;

saving said first print task when a print task failure occurs;

monitoring with at least one component of said plurality of print system components said network for a successful print task, wherein said successful print task is subsequent to said first print task failure;

identifying an alternate printer to which said successful print task was sent; and sending said saved, first print task to said alternate printer.

2. The method of claim 1 wherein said said saving and said sending to said alternate printer are controlled by at least one component of said plurality of pint system components.

3. The method of claim 1 wherein said at least one component of said plurality of print system components is a print processor.

4. The method of claim 1 wherein said at least one component of said plurality of print system components is a spooler.

5. The method of claim 1 wherein said sending only occurs when said alternate printer is the same printer as said selected printer.

6. The method of claim 1 further comprising determining the characteristics of said successful print task and said first print task and comparing said successful print task characteristics to said first print task characteristics to determine the compatibility of said alternate printer for said first print task and wherein said sending only occurs when said alternate printer is compatible with said first print task.

7. A method for recovering a failed print task, said method comprising:

initiating a first print task on a computing device, wherein said computing device comprises a plurality of print system components;

sending said first print task to a first component of said plurality of print system components;

sending said first print task to a selected printer that is one of a plurality of printing devices connected by a network;

monitoring with at least one component of said plurality of print system components said first print task for a print task failure;

saving said first print task when a print task failure occurs;

monitoring with at least one component of said plurality of print system components said network for a successful print task that originates subsequently to said first print task failure from a different computing device than the computing device from which said first print task originated;

identifying an alternate printer to which said successful print task was sent;

analyzing a characteristic of said successful print task to determine the compatibility of said alternate printer; and sending said saved, first print task to said alternate printer when said alternate printer is compatible with said saved, first print task.

8. The method of claim 7 wherein said analyzing comprises comparing the characteristics of said successful print task to the characteristics of said first print task.

9. The method of claim 7 further comprising comparing the capability of said alternate printer to the requirements of said first print task.

10. The method of claim 7 wherein said identifying comprises determining the location of said alternate printer and said analyzing comprises querying said alternate printer for its capabilities and comparing said alternate printer capabilities with the requirements of said first print task.

11. A method for recovering a failed print task, said method comprising:
   initiating a first print task on a computing device, wherein said computing device comprises a plurality of print system components;
   sending said first print task to a first component of said plurality of print system components;
   sending said first print task to a selected printer that is one of a plurality of printing devices connected by a network;
   monitoring with at least one of said plurality of print system components said first print task for a print task failure;
   prompting a user to prioritize said first print task when a print task failure occurs;
   saving said first print task when its priority is sufficiently high;
   monitoring with at least one of said plurality of print system components said network for a successful print task, wherein said successful print task is subsequent to said first print task failure;
   analyzing said successful print task characteristics to determine the capability of a printer to which said successful print task was sent;
   evaluating said printer's capability to determine whether said printer can print said first print task;
   prompting said user to choose to reprint said first print task if said printer is capable of printing said first print task; and
   sending said saved, first print task to said printer if said user has chosen to reprint said print task.

12. A method for recovering a failed print task, said method comprising:
   initiating a first print task on a computing device, wherein said computing device comprises a plurality of print system components;
   sending said first print task to a first component of said plurality of print system components;
   sending said first print task to a selected printer that is one of a plurality of printing devices connected by a network;
   monitoring with at least one of said plurality of print system components said first print task for a print task failure;
   saving said first print task;
   monitoring with at least one of said plurality of print system components said network for a successful print task, wherein said successful print task is subsequent to said first print task failure;
   analyzing said successful print task characteristics to determine the capability of the printer to which said successful print task was sent;
   evaluating said printer's capability to determine whether said printer can print said failed print task;
   modifying said first print task to allow printing on said printer when said first print task cannot otherwise be printed on said printer; and
   sending said modified, first print task to said printer.

13. The method of claim 12 wherein said modifying comprises emulating at least one element of said first print task in software that would otherwise have been performed by printer hardware.

14. The method of claim 12 wherein said modifying comprises emulating page formatting in software.

15. A system for recovering a failed print task, said system comprising:
   an initiator for initiating a first print task on a computing device, wherein said computing device comprises a plurality of print system components;
   a first sender for sending said first print task to a first component of said plurality of print system components;
   a second sender for sending said first print task to a selected printer that is one of a plurality of printing devices that are connected by a network;
   a first monitor, wherein said first monitor comprises at least one of said plurality of print system components, for monitoring said first print task for a print task failure;
   storage for saving a failed print task when a print task failure occurs;
   a second monitor, wherein said second monitor resides in at least one of said plurality of print system components, for monitoring said network for a successful print task, wherein said successful print task is subsequent to said first print task failure;
   an analyzer for analyzing said successful print task characteristics to determine the capability of the printer to which said successful print task was sent;
   an evaluator for evaluating said printer's capability to determine whether said printer can print said first print task; and
   a sender for sending said saved, first print task to said printer if said printer is capable of printing said first print task.

16. A computer readable medium comprising computer executable instructions for performing functions within a print system component, said instructions comprising the acts of:
   initiating a first print task on a computing device, wherein said computing device comprises a plurality of print system components;
   sending said first print task to a first component of said plurality of print system components;
   sending said first print task to a selected printer that is one of a plurality of printing devices connected by a network;
   monitoring with at least one of said plurality of print system components said first print task for a print task failure;
   saving said first print task when a print task failure occurs;
   monitoring with at least one of said plurality of print system components said network for a successful print task, wherein said successful print task is subsequent to said first print task failure;
   analyzing said successful print task characteristics to determine the capability of a printer to which said successful print task was sent;
   evaluating said printer's capability to determine whether said printer can print said first print task; and
   sending said saved, first print task to said printer if said printer is capable of printing said first print task.

* * * * *